Aug. 15, 1933.   G. H. KOCH   1,922,249
ARC WELDING APPARATUS
Filed March 24, 1931   2 Sheets-Sheet 2
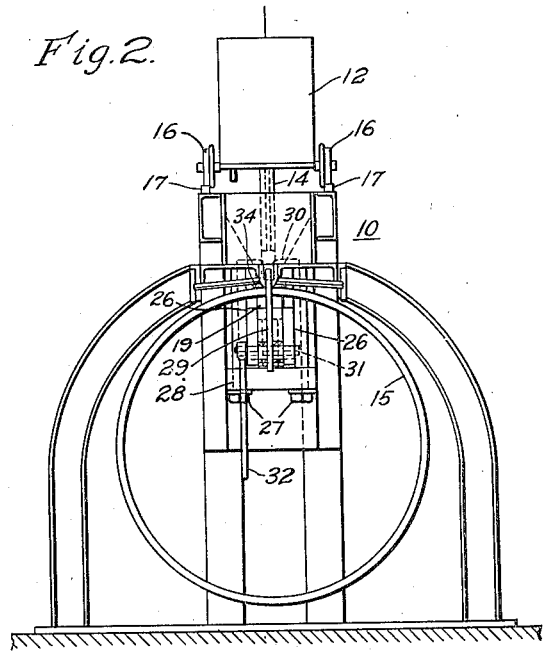
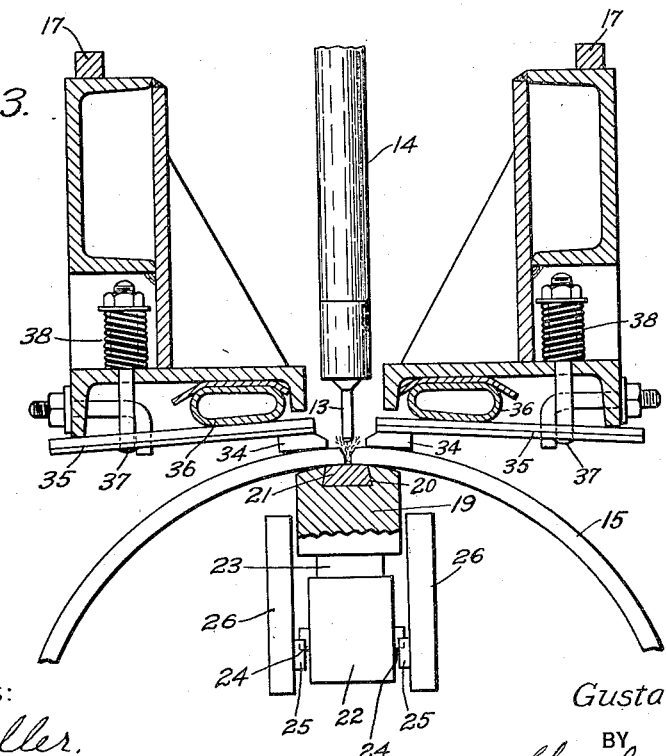
INVENTOR
Gustav H. Koch.
VITNESSES:

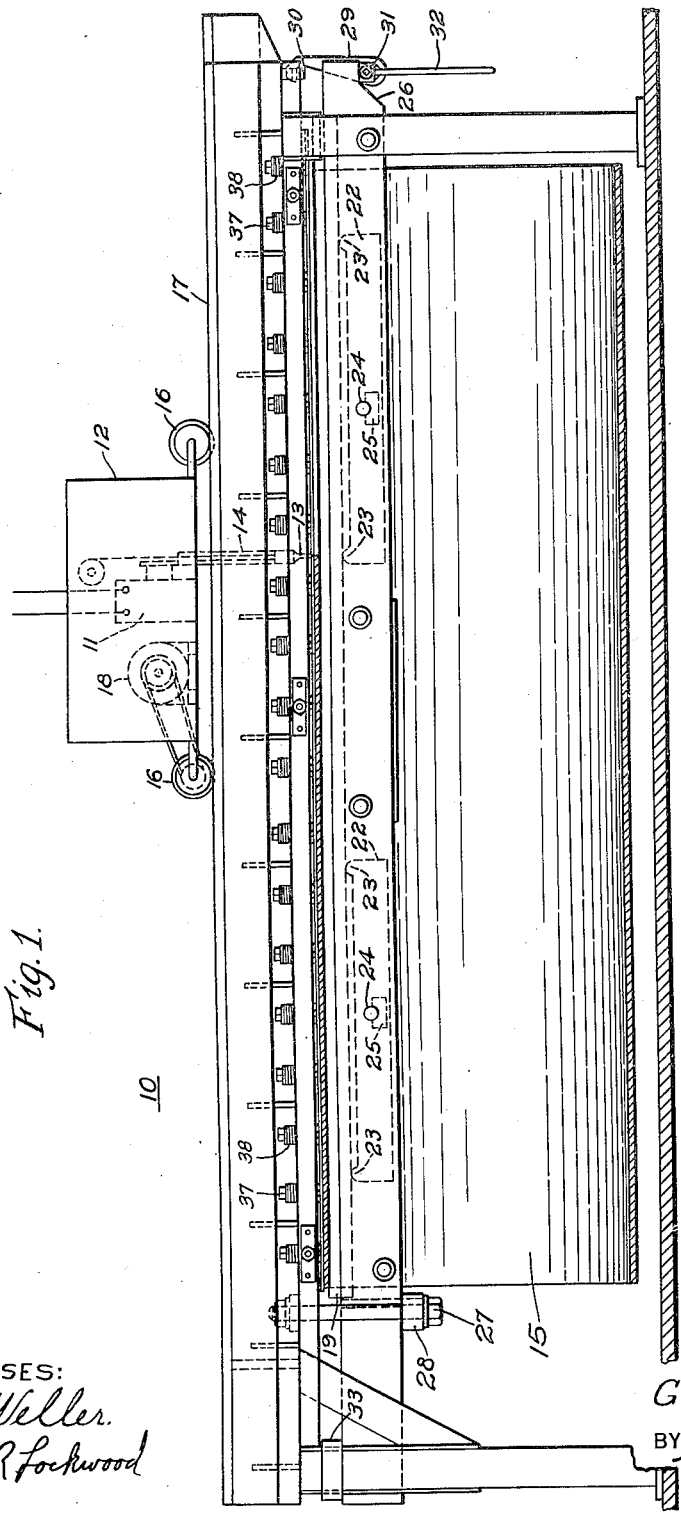

Patented Aug. 15, 1933

1,922,249

UNITED STATES PATENT OFFICE 1,922,249

ARC WELDING APPARATUS

Gustav H. Koch, Wilkinsburg, Pa., assignor to Westinghouse Electric & Manufacturing Company, a Corporation of Pennsylvania Application March 24, 1931. Serial No. 524,840

10 Claims. (Cl. 219—8)

My invention relates, in general to arc welding apparatus and it has particular relation to machines for making longitudinal seam welds in the manufacture of large metallic tanks or pipes.

It is necessary, in the manufacture of large metallic tanks or pipes in which longitudinal seam welds are made, to use a welding anvil for assisting in making the weld. The welding anvil serves to chill the weld as soon as it is made in order to minimize the amount of metal affected by the intense heat developed during the welding process. In addition, the welding anvil is utilized as a support to hold the abutting edges of the blank in position for welding and as an anvil on which the irregularities in the edges may be removed.

When it is desired to make longitudinal-seam welds in relatively long tanks or pipes, a correspondingly long welding anvil must be used. In the past, the welding anvil has been supported at its ends only, with the result that there was a considerable deflection at the center. Because of the deflection at the center of the welding anvil, it was not possible to make a satisfactory weld that would be uniform throughout its entire length.

The deflection at the center of the welding anvil is caused, for the most part, by the pressure that is exerted on the edges of the blank to cause them to come into intimate contact with the welding anvil. In addition, the weight of the blank carried by the welding anvil and the weight of the anvil itself serves to further increase the deflection.

It is, accordingly, an object of my invention to provide a welding machine for making longitudinal-seam welds in relatively long cylindrical tanks or pipes of large diameter.

Another object of my invention is to provide a welding machine having provision for rapidly cooling the weld as soon as it is made.

Still another object of my invention is to provide a longitudinal-seam welding machine having provision for removing irregularities in the edges of the blank to be welded and for holding them while the welding operation is performed.

It is also an object of my invention to provide for maintaining a blank, on which a welding operation is performed, in substantially straight form.

According to my invention, I support the welding anvil in the longitudinal-seam welding machine by means of a system of levers. The system of levers serves to maintain the welding anvil substantially straight, and it is then possible to obtain the desired welding conditions and a uniform straight seam along the abutting edges of the blank to be welded.

For a better understanding of my invention, reference may be had to the following description, taken in connection with the accompanying drawings, in which Figure 1 is a view, in side elevation, of a longitudinal-seam welding machine embodying my invention and showing, in section, a large cylindrical pipe in position for welding, Fig. 2 is an end view of the machine shown in Fig. 1, and Fig. 3 is an enlarged view showing the arrangement of the welding nozzle, clamping device and welding anvil relative to the pipe to be welded.

Referring to the drawings, the welding machine shown in Figs. 1 and 2 comprises a main frame 10 which is arranged to be self-supporting.

A welding head 11 is mounted on the carriage 12 and is arranged to feed a welding electrode 13 through the welding nozzle 14 to the pipe 15, the abutting edges of which are to be welded together. The welding head 11, which is suitable for automatically feeding the electrode 13 during the welding operation, may be of any standard construction and will not be described in detail in this specification.

The carriage 12 is provided with wheels 16 which are adapted to roll along the rails 17 that are mounted on the main frame 10. In order to propel the carriage 12 along the rails to move the welding electrode along the abutting edges of the pipe 15 for forming a continuous seam, motor 18 is mounted as shown.

The pipe 15, which is to be welded, is mounted on the welding anvil 19. A longitudinal slot 20 is provided in the surface of the welding anvil 19, as shown in Fig. 3, having a copper bar 21 mounted therein to prevent fusion between the pipe 15 being welded and the welding anvil.

The welding anvil is supported by means of supporting members 22 having projections 23 thereon for making line contact with the welding anvil 19. The supporting members 22 are pivotally carried by pins 24 which are journaled in bearings 25 that are, in turn, carried by longitudinal members 26. The longitudinal members 26 are supported from the main frame 10 at the left-hand end by means of bolts 27 and the yoke 28. At the right-hand end, a latch 29 is provided which is arranged to cooperate with a loop 30 carried by the main frame 10. An eccentric pin 31, which is turned by a handle 32, is arranged to cooperate with the latch 29 for removing it from engagement with the loop 30.

When the latch 29 is out of engagement with the loop 30, the longitudinal members 26 are supported as cantilevers through the cooperation of the bolts 27, yoke 28 and the block 33 placed between the main frame 10 and the longitudinal members 26.

As shown in Fig. 3, pressure for removing any irregularities that may exist in the abutting edges of the pipe 15 and for holding them in position for performing the welding operation, is exerted through the finger plates 34 attached to finger-supporting plates 35 by means of fluid pressure applied to expansible-hose members 36. It will be readily understood that this pressure may be exerted by compressed air or by any like fluid-pressure means.

The finger plates 34 are maintained out of contact with the pipe 15 by means of bolts 37 operated upon by springs 38.

The operation of the above-described apparatus may be set forth as follows:

The eccentric pin 31 is turned by handle 32 to remove the latch 29 from engagement with the loop 30.

The pipe 15 is placed on the welding anvil 19 with the abutting edges centrally located on the copper bar 21 between the finger plates 34. Pressure is applied to the expansible-hose members 36 and is transmitted, through finger-supporting plates 35 and finger plates 34, to the pipe 15. Sufficient pressure is applied to remove any irregularities which may exist in the abutting edges of the pipe 15 and to hold it in position for the welding operation. The motor 18 and the welding head 11 are energized from any suitable source of electric power (not shown), and a continuous weld is made along the abutting edges of the pipe 15.

On application of pressure to pipe 15, the welding anvil 19 is caused to move downwardly. In addition, the weight of the pipe 15 and the anvil 19 further increase the force causing the anvil to move in a downward direction. The pressure exerted on the welding anvil 19 is transmitted, through the projections 23 and the supporting members 22, by means of pins 24, to the longitudinal members 26. It will be readily seen that there is a maximum deflection at approximately the center of the longitudinal members 26. However, the pins 24 will move downwardly in directions substantially parallel.

Since the supporting members 22 are pivotally supported by pins 24, they will rotate slightly on deflection of the longitudinal members 26. The pressure exerted on the welding anvil will be transmitted, with substantial uniformity, throughout its length, and there will be relatively slight deflection at any point.

After the welding operation has been completed, the latch 29 is removed from the loop 30 by the operation of the eccentric pin 31 which is turned by handle 32. The pipe 15 is then removed from the welding machine and another pipe is placed on the welding anvil. The above-described operation may then be repeated.

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. In an arc welding apparatus, the combination of a welding anvil for supporting a blank to be welded, with pivotally mounted supporting members for supporting the welding anvil, the pivot points of the support members being downwardly movable to maintain the welding anvil substantially straight, irrespective of the pressure applied thereto.

2. Arc welding apparatus comprising, in combination, a main frame, a welding anvil disposed to support a blank on which a welding operation is to be performed, fluid-pressure means comprising expansible hose members carried by the main frame for pressing the blank against the welding anvil to remove irregularities that may exist in the blank, and support means for the welding anvil, carried by the main frame, to maintain the welding anvil straight under application of pressure thereto.

3. Arc welding apparatus comprising, in combination, a main frame, a welding anvil disposed to support a blank on which a welding operation is to be performed, fluid-pressure means comprising expansible hose members carried by the main frame for pressing the blank against the welding anvil to remove irregularities that may exist in the blank, and means, comprising a plurality of supporting members pivotally mounted on the main frame, to maintain the welding anvil straight under application of pressure thereto.

4. Arc welding apparatus comprising, in combination, a main frame, a welding anvil disposed to support a blank on which a welding operation is to be performed, fluid-pressure means comprising expansible hose members carried by the main frame for pressing the blank against the welding anvil to remove irregularities that may exist in the blank, and means comprising a plurality of pivotally mounted supporting members carried by the main frame and disposed to be moved downwardly to maintain the welding anvil straight under application of pressure thereto.

5. Arc welding apparatus comprising, in combination, a main frame, a plurality of supporting members pivotally carried by the frame, said supporting members having protuberances on the surface thereof, a welding anvil mounted on the protuberances of the supporting members to receive a blank having abutting edges to be welded, said welding anvil having a longitudinal slot in the surface thereof, a copper bar located in the slot to prevent fusion with the blank to be welded, fluid-pressure means carried by the frame and disposed to cause the blank to come into intimate contact with the welding anvil, and automatic means for forming a weld along the abutting edges of the blank.

6. Arc welding apparatus comprising, in combination, a main frame, a plurality of elongated members carried by the main frame, a plurality of bearings mounted on the longitudinal members, a plurality of pins journaled in the bearings, a plurality of supporting members carried by the pins, said supporting members having a plurality of projections on the surface thereof, a welding anvil mounted on the projections of the supporting members to receive a blank having abutting edges to be welded, said welding anvil having a longitudinal slot in the surface thereof, a copper bar located in the slot to prevent fusion with the blank to be welded, fluid-pressure means carried by the frame and disposed to cause the blank to come into intimate contact with the welding anvil, and automatic means for forming a weld along the abutting edges of the blank.

7. Support means for welding blank comprising, in combination, an elongated welding anvil for engaging the abutting edges of the blank to be welded, longitudinal holding means extending along the welding anvil, and a plurality of support members pivotally mounted on the longitudinal holding means for supporting the welding anvil.

8. Support means for a welding blank comprising, in combination, an elongated welding anvil for engaging the abutting edges of the blank to be welded, a plurality of longitudinal holding members extending along the welding anvil, and a plurality of support members pivotally carried by the longitudinal holding members for supporting the welding anvil.

9. Support means for a welding blank comprising, in combination, an elongated welding anvil for engaging the abutting edges of the blank to be welded, a plurality of longitudinal holding members extending along the welding anvil, a plurality of bearing members carried by the holding members, and a plurality of support members journaled in the bearing members for supporting the welding anvil in substantially straight line relationship irrespective of the pressure applied thereto.

10. Support means for a welding blank comprising, in combination, an elongated welding anvil for engaging the abutting edges of the blank to be welded, a plurality of longitudinal holding members extending along the welding anvil, a plurality of pairs of oppositely disposed bearing members carried by the holding members, and a plurality of support members journaled in the bearing members and provided with upwardly extending projections near the ends thereof for supporting the welding anvil.

GUSTAV H. KOCH.